United States Patent Office 3,437,600

Patented Apr. 8, 1969

3,437,600

ZINC-SULPHIDE PHOSPHOR

William A. Goldman, East Meadow, N.Y., assignor to Canrad Precision Industries, Inc., New York, N.Y., a corporation of New York No Drawing. Continuation-in-part of application Ser. No. 387,782, Aug. 5, 1964. This application Feb. 5, 1968, Ser. No. 703,189

Int. Cl. C09k *1/12*

U.S. Cl. 252—301.6 4 Claims

ABSTRACT OF THE DISCLOSURE

The present invention is directed to an improved zinc sulfide phosphor having increased phosphorescence and luminescence, which phosphor contains a silicon-manganese complex dispersed therein. The phosphors of this invention are rendered luminous by impinging radiation and exhibit light for an extended luminescent period.

This application is a continuation-in-part application of my application Ser. No. 387,782, filed on Aug. 5, 1964, and now abandoned.

Background of the invention

Phosphors, and particularly zinc-sulfide phosphors, are well known in the art. Description of such materials may be found in various publications such as for example: National Research Council—Preparation and Characteristics of Solid Luminescent Materials (Wiley, 1940), and H. Leverenz—An Introduction to Luminescence of Solids (Wiley, 1950). In general, zinc-sulfide phosphors give only a period of approximately one hour of phosphorescence upon removal of the light source. There thus exists a considerable interest in increasing phosphorescence periods of such zinc-sulfide phosphors. In accordance with the present invention this objective has been obtained and zinc-sulfide phosphors having a luminescent period of 8 to 10 hours have been produced. These zinc-sulfide phosphors can be used in various conventional applications for such type materials as paints, and luminescent plastic tapes and markers (molded).

Detailed description

More particularly, in accordance with the present invention, a specific silicon-manganese complex containing from 90 to 95% by weight of silicon and from 5 to 10% by weight of manganese is first separately formed and then introduced into an admixture of ingredients suitable for forming the zinc sulfide-phosphor. This complex is introduced in the ingredients which form the phosphor to provide the complex in an amount of from 5% to 20% by weight and the ingredients which form the phosphor in an amount of from 80% to 90% by weight. The admixture is then heated to provide a phosphor containing 5% to 20% by weight of the silicon manganese complex.

In the initial silicon-manganese complex forming steps, silicon and manganese liberating compound are added and admixed in an amount sufficient to provide from about 90 to 95% by weight of the complex of silicon and from about 5% to 10% manganese. The admixture is placed into a 525 cc. silicon crucible and subjected to heating for any period of from ½ hour to 10 hours or longer in a gas fired surface combustion furnace at a temperature of 1700° F. to 2300° F., preferably 1900° F. to 2100° F. to form a silicon-manganese complex. The exact chemical nature of this complex has not been completely determined.

In forming the complex, silicon in any form can be utilized, such as a grade of silicon suitable for silicon cell use. Also manganese or any compound capable of yielding manganese upon heating can be employed in the forming of the complex in accordance with this invention such as manganese acetate, manganese chloride, manganese carbonate, etc.

The heating step in forming the complex can be carried out by heating at the above temperatures for at least ½ hour. If desired, heating can be continued for 10 hours or longer with no adverse effects.

The resulting silicon-manganese complex is generally a gray amorphous powder is thereafter removed from the furnace or heating means.

It is to be clearly noted that the initial formation of the silicon-manganese complex is performed in the absence of any zinc containing compound. When zinc is present in this initial stage and the resulting complex blended with a zinc-sulfide phosphor and calcined, the phosphorescent characteristics are greatly reduced. It is believed that this loss of phosphorescence arises by virtue of the zinc causing an excitation to occur whereby a higher energy non-metastable state is created from which a rapid radiative return to ground state occurs, at which point no light emission results. Thus, the inclusion of zinc or zinc-containing compounds in the initial silicon-manganese complex reduces phosphorescence characteristics of the ultimate phosphor.

After forming the silicon-manganese complex, the complex is then mixed with an admixture of conventional ingredients employed in forming a zinc-sulfide phosphor such as ZnS, $MgCl_2$ (flux), NaCl, Cu activator, and the total mixture subjected to calcination at conventional calcination temperatures, e.g. of the order of 700 C. to 1200° C., preferably 1000° C. to 1200° C. Any conventional ingredients employed in making zinc sulfide phosphors can be employed in producing the phosphor in accordance with this invention. The result of this operation is to produce a dispersion of the silicon-manganese complex which acts as an activator in the zinc-sulfide phosphor. The resulting zinc-sulfide phosphor has been found to offer extended and longer periods of phosphorescence.

While the exact mechanism giving rise to the present improved zinc-sulfide phosphor is not completely understood, it is believed that the silicon-manganese complex enters the lattice structure of the ZnS crystal introducing a metastable condition in the ZnS phosphor and creating what is called an unnatural delay in the radiative return of the excited system to the ground state (zero energy level). This phenomenon indicates the formation of additional electron traps in the crystal lattice which inhibit the electron return from the excited to the ground state.

It is to be clearly noted that it is known in the art to individually add silicon and/or manganese to a zinc-sulfide phosphor. However, in those cases silicon acts only as a carrier and the resultant phosphor is basically different from that obtained in accordance with the present invention. Similarly, merely adding manganese to a zinc-sulfide phosphor is not tantamount to the present invention, nor does it give the present invention's advantageous results.

The following tabular presentation presents the temperatures used in the first and second steps:

TABLE I

Step I—Silicon-manganese complex formation:

| | Temperature, ° F. |
|---|---|
| Broad range | 1700–2300 |
| Preferred range | 1900–2100 |

Step II—Calcining step to form phosphor:

| | Temperature of Calcination, ° C. |
|---|---|
| Broad range | 700–1200 |
| Preferred range | 1000–1200 |

This calcination step can utilize any of the conventional conditions commonly utilized in calcinating zinc-sulfide phosphors.

The various aspects of the present invention can be made more clearly apparent by reference to the following specific example illustrating same.

EXAMPLE

A solution of zinc chloride of high purity is provided by dissolving 1700 gr. C.P. zinc in 4800 cc. C.P. hydrochloric acid. The resulting zinc chloride solution is admixed with 6800 cc. ammonium hydroxide, containing 40 cc. ammonium sulfide. This is filtered to remove impurities. 40 cc. of a $CuCl_2$—$2H_2O$ 10 mg./liter is then added, and the total then saturated with purified hydrogen sulfide to form a zinc-sulfide precipitation. The zinc-sulfide precipitate is allowed to settle and the ammonium sulfide liquor is decanted. The slurry is then placed in a porcelain vacuum filter and evacuated overnight. The resultant dry cake is placed in silicon trays on hot plates for complete drying. Upon drying, zinc-sulfide of good purity is provided.

Zinc-sulfide prepared in the above manner is placed in a 525 cc. silica crucible and fired at 1150° C. for about 2 hours and then slowly cooled to room temperatures to produce a phosphorescent zinc-sulfide phosphor.

The resulting phosphor is sieved 200 mesh and a portion of it is set aside to be used as a control phosphor. About 20 grams of a powdered silicon-manganese complex containing silicon of a grade suitable for silicon cell use is added to 170 grams of the zinc sulfide phosphor. The silicon-manganese is provided by firing a mixture of 95% by weight of amorphous silicon powder with 5% by weight manganese at about 2200° F. for about 2½ hours. The mixture of 10 parts by weight of the powdered silicon-manganese complex and 90 parts by weight of the zinc sulfide phosphor is placed in a quartz crucible and fired at about 700° F. for about 50 minutes. After completion of the firing, the improved phosphor is slowly cooled to room temperature.

A sample of the improved phosphor and a sample of the control phosphor are activated under similar conditions by exposure for 5 minutes under a 100 watt lamp bulb at a distance of about 12 inches. At the end of this time, the light is turned off and the two phosphor samples are examined under darkened conditions. The initial phosphorescence of each stample is measured. Two minutes after excitation, the improved phosphor containing the silicon-manganese has a brightness of 78 microlamberts while the control phosphor has a slightly lower brightness of 76 microlamberts. For practical applications, the lowest value of phosphorescent brightness which can be perceived by the naked eye under normal conditions is about 0.05 microlambert. The samples are examined periodically after excitation and are found to give the results, expressed in microlamberts, shown in the following table:

TABLE II.—MICROLAMBERT BRIGHTNESS VALUES

| | ½ hr. | 1 hr. | 2 hr. | 4 hr. | 6 hr. | 24 hr. |
|---|---|---|---|---|---|---|
| B—Control | 0.6 | 0.96 | N.V. | N.V. | N.V. | N.V. |
| A—Improved | 5.2 | 2.2 | 1.3 | 0.84 | 0.49 | 0.06 |

N.V.—Not visible.

From this table it can be seen that the improved phosphor has an afterflow that can be seen by an eye accustomed to the darkness up to 24 hours after activation, but the afterglow of the control sample is no longer visible after about 1½ hours.

Having described the present invention that which is sought to be protected is set forth in the following claims.

What is claimed is:

1. A process for forming a zinc-sulfide phosphor which comprises providing a mixture of silicon and a compound capable of liberating manganese in an amount sufficient to form a complex consisting of from about 90 to 95% by weight of silicon and from about 5% to 10% by weight of manganese upon heating said mixture to a temperature of from about 1700° F. to about 2300° F., heating said mixture at said temperature to form a silicon-manganese complex, admixing said complex with materials which form a zinc-sulfide phosphor in an amount sufficient to provide from about 80 to 95% by weight of phosphor and from about 5% to 15% by weight of said complex, and heating said admixture to a temperature of from about 700° C. to 1200° C.

2. The process of claim 1 wherein said mixture is heated to temperature of from 1900° F. to 2100° F.

3. The process of claim 1 wherein the admixture is heated to a temperature of from about 1000° C. to 1200° C.

4. A zinc-sulfide phosphor composition having dispersed therein 5 to 15 weight percent of a complex consisting of from about 90 to 95% by weight of silicon and from about 5% to 10% by weight of manganese.

References Cited

Wachtel: ZnS:Cu, Si Phosphors—Journal of the Electrochemical Society, vol. 108, No. 6, June 1961, pp. 534–540.

Hansen: Metallurgy—Constitution of Binary Alloys, 1958, pp. 953–954. Copy in Group III.

TOBIAS E. LEVOW, *Primary Examiner.*

ROBERT D. EDMONDS, *Assistant Examiner.*